Feb. 17, 1931.   J. HACKETHAL   1,793,228
VALVE REGULATING APPARATUS
Filed April 26, 1930
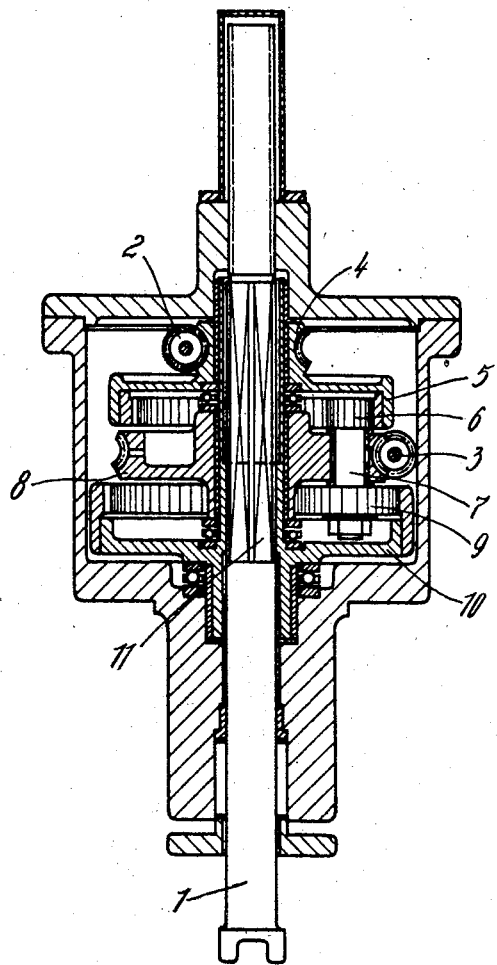
Inventor
Johannes Hackethal
by Knight Bros
attorney

UNITED STATES PATENT OFFICE

JOHANNES HACKETHAL, OF BERLIN-CHARLOTTENBURG, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

VALVE-REGULATING APPARATUS

Application filed April 26, 1930, Serial No. 447,573, and in Germany May 6, 1929.

My invention relates to an improvement in valve regulating apparatus, by which the spindle may be adjusted both by a motor and by hand.

Arrangements are known, in which valves are adjusted by an electric motor and special hand wheels are provided to enable an additional adjustment to be made, or for maintaining operation in case of a disturbance in the supply of electricity. But these arrangements have the disadvantage that when the adjustment takes place by means of the motor, the hand wheel also turns, and vice-versa. In order to avoid having to turn the movable part of the motor, when adjusting by hand, it has already been proposed not to connect the gear wheel, driven by the motor, tightly to the valve spindle, but to insert between the gear wheel and valve spindle a suitable free-wheel coupling. With this arrangement the adjustment of the valve spindle by hand is possible without the movable parts of the motor accompanying the movement, but if the adjustment takes place through the motor the hand wheel takes part in the movement. With this known arrangement, therefore, there is the danger that persons are injured by the handle on the hand wheel suddenly beginning to turn when the spindle is adjusted by the motor.

According to the present invention, shown in the accompanying drawing in longitudinal section, the valve operating gear is so designed that when the one driving means is in operation the other will remain motionless.

The invention consists in transmitting the rotation of both driving shafts to the valve spindle through a differential gear. A differential gear serves in the first place to produce from two different rotating movements a third resulting rotating movement, proportional to the sum of the two rotating movements. With the arrangement according to my invention, it is without further trouble possible, for both kinds of drive to be put into operation at the same time and the spindle to revolve at a speed resulting from these two movements. Generally, this will not be the case, but only one movement will be transmitted to the spindle. With this construction of the gear, the other driving shaft must then, if the bearings are made with the necessary care, remain motionless. The working is surer, however, if, instead of a spur-wheel transmission, two self locking worm gear drives are used to operate the differential gear.

As, at the same time, the motor speed is, by means of the differential gear, reduced to as low a spindle speed as possible, it is advantageous to choose an arrangement which enables the speed ratio to be made as large as possible. This can be realized, for instance, by employing a planetary gear. The construction may then be so that the worm wheel driven by the motor carries planetary pinions of different diameters, engaging with two internally toothed wheels, one wheel with internal teeth being in mesh with the worm wheel moved by the hand wheel, and the other with the valve spindle.

Referring to the drawing, 1 is the spindle of a valve, which is turned either through the shaft 2 by a hand wheel, not shown on the drawing, or through the shaft 3 by an electric motor not shown on the drawing. Each of the driving shafts operates a self locking worm drive. The worm wheel 4 belonging to the driving shaft 2 is made integral with the internally toothed wheel 5. A pinion 6 meshes with the internal teeth of wheel 5. The shaft 7 of the pinion is journalled in the worm wheel 8 which is driven by motor shaft 3. Pinion shaft 7 carries in addition to pinion 6 another gear wheel 9, the diameter of which is larger than that of pinion 6. The gear wheel 9 meshes with the internal teeth of the wheel 10. By means of wheel 10, the torque is transmitted to the square head 11 of the spindle 1 thus causing the adjustment of the valve.

The mode of working of the apparatus is as follows:

Assuming that the adjustment of the valve spindle is made by means of the hand wheel shaft 2, then the worm wheel 4 and the internally toothed wheel 5 in connection with same is rotated. The worm wheel 8 does, however, not turn, as it is locked by the worm on the motor shaft 3. The rotation of the wheel 5 rotates now pinion 6. Gear wheel 9 which is fixed with pinion 6 on the same shaft 7, also rotates and thereby rotates internally toothed wheel 10 and with it the valve spindle 1. Owing to the different size of the diameters of the gears 6 and 9, the speed of the worm wheel 4 is transmitted to the spindle at a certain ratio.

If the adjustment is not effected by the hand wheel shaft 2, but by the motor 3, the working is as follows:

In this case the worm wheel 8 is rotated by the worm on the motor operated shaft 3, whereas the worm wheel 4, and the internally toothed wheel 5 connected with the latter remain locked by worm 2. The pinion 6 is thus forced by the rotation of the worm wheel 8 which takes along shaft 7, to roll on the teeth of wheel 5, and gear shaft 7 is thereby also rotated on its own axis. If the gear wheel 9 had the same diameter as pinion 6, no rotation of the valve spindle would be produced for obvious reasons. Since gear wheel 9 has a larger diameter than pinion 6, makes the same number of revolutions as the pinion 6, there results a difference in the circumferential speed of wheel 9, which is imparted to gear wheel 10. In this manner the speed of the motor may be reduced in a large degree to suit the valve spindle speed.

I claim as my invention:

1. A valve driving gear for rotating a valve spindle independently by a hand driven and a motor driven shaft, comprising a self locking worm gear drive operated by the hand driven shaft and an internally toothed gear wheel coaxially fixed to the worm wheel of said worm gear, and disposed rotatably around the spindle shaft, a second self locking worm gear operated by the motor driven shaft and having its worm wheel disposed to freely rotate about the spindle shaft, a second internally toothed gear wheel larger in diameter than the first internally toothed wheel, and being mounted on and coupled to said spindle shaft, and a pair of planetary gear wheels fixed on a common shaft journalled in said second worm wheel, one of said planetary wheels being in mesh with said first internally toothed wheel, the other planetary wheel being in mesh with the second internally toothed wheel.

2. A valve driving gear for rotating a valve spindle independently by a hand driven and a motor driven shaft, comprising a self locking worm gear drive operated by the hand driven shaft and an internally toothed gear wheel coaxially fixed to the worm wheel of said worm gear, and disposed rotatably around the spindle shaft, a second self locking worm gear operated by the motor driven shaft and having its worm wheel disposed to freely rotate about the spindle shaft, a second internally toothed gear wheel larger in diameter than the first internally toothed wheel, and being mounted on and coupled to said spindle shaft, and a pair of planetary gear wheels fixed on a common shaft journalled in said second worm wheel, one of said planetary wheels being in mesh with said first internally toothed wheel, the other planetary wheel being in mesh with the second internally toothed wheel, the worm wheel of the hand driven worm gear drive having a smaller diameter than the worm wheel of the motor drive worm gear.

In testimony whereof I affix my signature.

JOHANNES HACKETHAL.